United States Patent [19]
Jones

[11] Patent Number: 5,258,692
[45] Date of Patent: Nov. 2, 1993

[54] ELECTRONIC BALLAST HIGH POWER FACTOR FOR GASEOUS DISCHARGE LAMPS

[75] Inventor: William H. Jones, Villa Park, Ill.

[73] Assignee: Appliance Control Technology, Inc., Addison, Ill.

[21] Appl. No.: 892,332

[22] Filed: Jun. 2, 1992

[51] Int. Cl.⁵ ............... H05B 41/16; H05B 41/24
[52] U.S. Cl. ................... 315/247; 315/205; 315/209 R; 315/244; 315/DIG. 5; 315/DIG. 7; 315/241 R
[58] Field of Search ............... 315/205, 209 R, 219, 315/224, 241 R, 244, 247, DIG. 5, DIG. 7

[56] References Cited
U.S. PATENT DOCUMENTS

| | | | |
|---|---|---|---|
| 5,008,599 | 4/1991 | Counts | 315/247 |
| 5,083,065 | 1/1992 | Sakata et al. | 315/307 |
| 5,103,139 | 4/1992 | Nilssen | 315/219 |
| 5,103,141 | 4/1992 | Keijser et al. | 315/307 |

Primary Examiner—Robert J. Pascal
Assistant Examiner—Arnold Kinkead
Attorney, Agent, or Firm—Robert J. Black

[57] ABSTRACT

An electronic ballast for correcting the power factor within a fluorescent lamp system. Use of an inductor in one of the AC power source leads and selected values of capacitance in a voltage divider and starting circuit combine to provide a power factor greater than 94%.

9 Claims, 1 Drawing Sheet

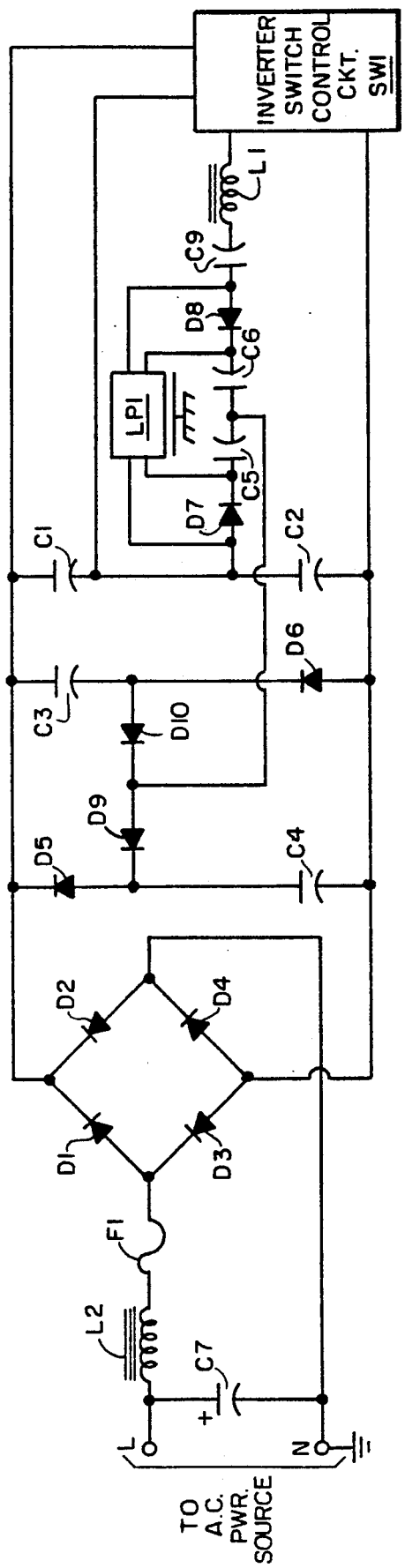

ELECTRONIC BALLAST HIGH POWER FACTOR FOR GASEOUS DISCHARGE LAMPS

BACKGROUND OF THE INVENTION

1. Field of the Invention

The present invention relates generally to an electronic ballast suitable for use with gaseous discharge lamps and more particularly to a circuit for correcting the power factor within a fluorescent lamp system.

2. Background Art

Fluorescent lamps usually require a ballast circuit for producing a direct current signal with a high voltage amplitude for effective operation of the fluorescent lamp. Ballasts of this type are typically separated into two broad categories, the first being of the electromagnetic type while the second is of a true electronic form. In this last particular type, it has been found that electronic ballasts inherently had power factors of 50% or less. Especially those associated with so-called "task" lighting which draw 30 watts or less power. In such small lamps the power factor is a numerical value that expresses the angular relationship found between load current and line voltage. If load current and the line voltage are in phase timewise, the power factor is 100%. When the percentage is substantially lower, a greater angle exists in between the two. Where a low power factor is present, this arrangement typically results in a substantially higher current draw from the power line for a given output lamp load. More importantly, power factors are frequently the cause of an unbalanced current loading. If such a situation develops, the neutral line could then become overloaded and burn out.

A number of schemes have been used to correct for the out-of-phase relationship between load current and line voltage in electronic ballasts. Most schemes employ some kind of an expensive saturable inductor in a "buck" or "boast" mode. Such an arrangement is taught in U.S. Pat. No. 4,109,307. Other approaches to the particular problem are diclosed in U.S. Pat. Nos. 4,415,839, 5,008,599, and 4,647,817. None of these provide the satisfactory and low cost approach to the solution of the above noted problem found in the present invention.

SUMMARY OF THE INVENTION

The present invention employs an inverter switch control circuit similar to that found in many of the prior art electronic ballast circuits. Such circuits are well known and include a pulse generator which develops gating circuits for a pair of switching devices transistors which alternately supply AC pulses of appropriate voltage and magnitude to the fluorescent lamp network. In such an arrangement a potential is developed by the transistors, which alternates as positive and negative going pulses which are applied to the fluorescent lamp.

The power factor is substantially improved in the present invention by inserting an inductor in one of the leads from the power line to the rectifier circuit included within the ballast circuitry. This inductive impedance acts to retard the surge current spike when the capacitors included therein recharge at each 90 degrees on each cycle of the AC wave. Thus, the narrow spike is made quite broad and as a consequence a 94.5% power factor was achieved in the present embodiment of the invention.

In the arrangement taught in the present invention, as an aid to starting, capacitance is inserted in parallel with the fluorescent lamp. The center of that capacitance is connected to a midpoint between a pair of capacitors in a voltage divided circuit bridging the rectifier output. This arrangement provides an aid in starting and also is valuable in providing substantial assistance in the protection at the end of lamp life. It also prevents ballast burnout. As contrasted to the arrangements taught in the prior art, this eliminates one diode and clamps the midpoint to the center of the power supply divider.

When the capacitance in parallel with the lamp is divided, the value of each section is not equal. It was found that in the present invention, a ratio of approximately 3:1 provided the optimum performance. The capacitors in the voltage divider across the output of the rectifier are selected to have critical values in assisting in achieving a high power factor. It has been found in the present invention that a value of approximately 15 microfarads gives the highest power factor for a 15 watt lamp such as the F15T8. For a 30 watt lamp such as the as the F30T8, the value of 47 microfarads was determined as providing the best operation. It has been determined empirically that the capacitor value needs to be tuned to match the fluorescent lamp size.

It might also be noted that the inductance inserted into one of the leads to the power line effectively serves a dual purpose. In addition to providing for the substantially high power factor achieved in the present circuitry, the inductor may serve as a noise filter to prevent objectionable noises created in the electronic ballast itself from feeding back into the power lines and adversely affecting any other equipment located at the same site. Accordingly it has been determined that the present invention provides an economical high power factor electronic ballast for the task lighting market.

BRIEF DESCRIPTION OF THE DRAWING

The single drawing of the present invention is a combination schematic and block diagram of an electronic ballast circuit for use with fluorescent lamps in accordance with the present invention.

DESCRIPTION OF THE PREFERRED EMBODIMENT

Referring now to the drawing, the circuitry of the present invention includes an inverter switch control circuit SW1 of conventional design, the details of which do not form a portion of the present invention only being required that it provide the necessary periodic pulses to provide adequate potential for operation of a fluorescent lamp such as LP1.

The ballast circuit is connected to a traditional alternating current power source at terminals L and N. Diodes D1, D2, D3 and D4 act as a bridge rectifier connected to the AC power source. Connected across the power source is filter capacitor C7. In the lead between the terminal designated as L to the AC power source and the bridge rectifier between that connection existing between diodes D1 and D3, is inductor L2 and protective fuse F1. Power connections from the bridge rectifier to the inverter switch control circuit are taken from terminals existing between diodes D1 and D2, and also from a connection between diodes D3 and D4. These two points provide the main power busses to the inverter switch control and also to a voltage divider consisting of capacitor C3, C4, diodes D5, D6, D9 and D10. In the center of this voltage divider a connection is made to capacitors C5 and C6 which are in parallel with lamp LP1.

The presence of the inductor L2 in one of the leads to the power line, namely that connected to terminal L, acts to retard the surge current spike when the capacitor C7, is recharged at 90 degrees in each cycle of the alternating current wave. This causes the narrow spike usually occurring to become quite broad based on the present invention of a 94.5% power factor.

Additional substantial improvement was provided by connecting the center of the lamp parallel capacitance between capacitors C5 and C6 to the midpoint between capacitors C3 and C4. This midpoint connection taken between diodes D9 and D10 provides the necessary connections to the aforementioned capacitors C3 and C4.

Inductor L1 in combination with capacitors C5 and C6 form a series resonant circuit at a frequency of approximately 30 kilohertz. This frequency is necessary to provide the necessary high voltage for operation of lamp LP1. Capacitor C9 acts as a blocking capacitor to any DC component from inverter switch control circuit SW1 extended through inductor L1. Capacitors C1 and C2 provide an alternate return path for the transistors included in the inverter switch control circuit SW1.

It has been found in the present invention that the value of the two capacitors C5 and C6 in parallel with the lamps LP1 can provide the best operation when the value of capacitor C5 is in the nature of 0.1 microfarads while that of C6 is 0.033 microfarads. It was discovered that a ratio of 1:1 in the capacitance between these two capacitors would not operate. Accordingly, while a ratio of about 3:1 works best, other ratios between 2:1 to 4:1 also may be useful.

It has been further determined that the value of the divider capacitors C3 and C4 is extremely critical in achieving the high power factor available in the present circuitry. It has been determined for a 30 watt lamp (such as an F30T8) a value of 47 microfarads provides optimum operation. Similarly a value of 15 microfarads is found to be appropriate for 15 watt lamps such as the F15T8. While these values were determined as being optimum, other values from 12 to 20 microfarads would be useful with the 15 watt lamps while capacitors with 33 to 68 microfarads would be appropriate for the 30 watt lamps. The use of the two capacitors C3 and C4 in their center tapped arrangements force current to flow in what is commonly called a "valley fill" means. This arrangement forces the current to be in phase with the line voltage.

Diodes D7 and D8 across the filament windings of lamp LP1 act to reduce the voltage by a factor of approximately 50%.

While but a single embodiment of the present invention has been shown, it will be obvious to those skilled in the art that numerous modifications may be made without departing from the spirit of the present invention which shall be limited only by the scope of the claims appended hereto.

What is claimed is:

1. A ballast circuit for a fluorescent lamp comprising:
rectifying means including a circuit output, and further including a circuit input coupled to an alternating current power supply, operated to rectify alternating current from said power supply;
impedance means connected between said alternating current power supply and said rectifying means circuit input;
an inverter circuit connected between said rectifying means circuit output and said lamp to provide operating current to said lamp;
a starting circuit connected in parallel to said lamp, comprising first and second serially connected capacitors;
a voltage divider circuit connected to said rectifying means circuit output and further including a circuit connection to a point between said first and second serially connected capacitors.

2. A ballast circuit for a fluorescent lamp as claimed in claim 1 wherein:
said rectifying means comprise a plurality of diodes connected in a bridge configuration.

3. A ballast circuit for a fluorescent lamp as claimed in claim 1 wherein:
said impedance means comprise an inductor.

4. A ballast circuit for a fluorescent lamp as claimed in claim 1 wherein:
ratio of the capacity values of said first and second capacitors has a range of from 2:1 to 4:1.

5. A ballast circuit for a fluorescent lamp as claimed in claim 1 wherein:
voltage divider circuit includes third and fourth capacitors each connected to said rectifying means circuit output.

6. A ballast circuit for a fluorescent lamp as claimed in claim 5 wherein:
said voltage divider circuit further includes a pair of diodes serially connected between said third and fourth capacitors.

7. A ballast circuit for a fluorescent lamp as claimed in claim 6 wherein:
said circuit connection to a point between said first and second serially connected capacitors extends from a second point between said diode pair.

8. A ballast circuit for a fluorescent lamp comprising:
rectifying means comprising a plurality of diodes in bridge configuration including a circuit output and further including a circuit input coupled to an alternating current power supply, operated to rectify alternating current from said point supply;
impedance means comprising an inductor connected between said alternating current power supply and said rectifying means circuit input;
an inverter circuit connected between said rectifying means circuit output and said lamp to provide operating current to said lamp;
a starting circuit connected in parallel to said lamp comprising first and second serially connected capacitors wherein said first capacitor has a value of substantially equal to one-third that of said second capacitor;
a voltage divider circuit connected to said rectifying means circuit output comprising third and fourth capacitors each including a circuit connection to said rectifying means circuit output and a pair of diodes serially connected between said third and fourth capacitors and further including a circuit connection from a point between said diode pair to a point between said first and second serially connected capacitors.

9. A ballast circuit for a fluorescent lamp as claimed in claim 1 wherein:
said lamp includes two heatable electrodes located spaced from each other within a discharge vessel, said starting circuit connected in parallel to said lamp is in series with said heatable electrodes.

* * * * *